(12) United States Patent
Morita

(10) Patent No.: US 6,440,602 B1
(45) Date of Patent: Aug. 27, 2002

(54) BATTERY PACK

(75) Inventor: Yuichi Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/500,370

(22) Filed: Feb. 8, 2000

(30) Foreign Application Priority Data

Feb. 8, 1999 (JP) .......................................... 11-029941

(51) Int. Cl.$^7$ ............................................. H01M 10/50
(52) U.S. Cl. .......................... 429/120; 429/100; 429/7; 429/97
(58) Field of Search ............................ 429/99, 100, 96, 429/120, 97, 62, 61, 90, 92, 149, 159, 7; 320/150

(56) References Cited

U.S. PATENT DOCUMENTS 6,002,240 A  * 12/1999 McMahan et al. .......... 320/150
6,152,597 A  * 11/2000 Potega ....................... 374/185

FOREIGN PATENT DOCUMENTS

| JP | 62-106469 | 7/1987 |
| JP | 63-182462 | 11/1988 |
| JP | 10-284133 | 10/1998 |

* cited by examiner

Primary Examiner—Patrick Ryan
Assistant Examiner—R. Alejandro
(74) Attorney, Agent, or Firm—Scully, Scott, Murphy & Presser

(57) ABSTRACT

Even when an ambient temperature of a battery housed in a battery pack is detrimentally low, the battery is capable of performing its normal discharge operation, and thereby preventing the available period of time of an electronic device powered by the battery from decreasing due to such detrimentally low ambient temperature. In the battery pack: a positive plate and a negative plate are in a side portion of the battery; a heating element receives therein the battery, wherein the battery has both the positive plate and the negative plate electrically connected with a control circuit board, the control circuit board being electrically connected with the heating element through a pair of lead wires, wherein these components are assembled into an assembly which is inserted into a lower casing in a condition in which the control circuit board is projected outward from the heating element, so that the control circuit board is mounted on a board support base provided with a plurality of terminal output ports; and, an upper casing is mounted on both the assembly and the lower casing 8 to cover them from above.

2 Claims, 3 Drawing Sheets

BATTERY PACK

BACKGROUND OF THE INVENTION

1. Field of the Invention

The present invention relates to a battery pack used in a variety of electronic devices, and more particularly to the battery pack which has electronics for heating or protecting the battery pack from a detrimental low temperature in a discharge cycle or discharge operation of the battery pack.

2. Description of the Related Art

A battery pack has been widely used as a main power supply in a variety of electronic devices including cellular phones and a like, and constantly improved in order to increase its per charge life as much as possible.

Shown in FIG. 1 is a graph of a conventional battery pack, illustrating its temperature characteristics. In this graph: a horizontal axis represents a battery capacity in a discharge cycle; a vertical axis represents a variation of battery voltage (volts); and, each of three curves denoting ambient temperatures "−10° C.", "0° C." and "20° C." of a battery housed in the battery pack shows the relationship between the battery capacity in discharge cycle and the variation of battery voltage (volts) at each of the ambient temperatures "−10° C.", "0° C." and "20° C.". As is clear from the graph shown in FIG. 1, as the ambient temperature of the battery decreases, the available battery capacity in discharge cycle of the battery pack decreases. This is a problem inherent in the conventional battery pack.

Incidentally, an example of the conventional battery pack is disclosed in Japanese Laid-open Patent Application No. Hei10-284133, which illustrates heating of the battery of the battery pack during only its charging cycle or charging operation for a purpose of improving its charging efficiency when an ambient temperature of the battery of the battery pack is so low as to be out of a moderate temperature range compatible with normal charging operation of the battery. In operation, this conventional battery is heated by a heating element, wherein the heating element is powered from an external battery charger not from the battery itself. In addition, the conventional battery pack disclosed in the Japanese Laid-open Patent Application No. Hei10-284133 does not disclose nor suggest any idea of heating the battery by using its own electric power in its discharge cycle or discharge operation for the purpose of permitting the battery to keep its normal discharge operation effective even when the ambient temperature of the battery is so low as to be out of a moderate temperature range compatible with its normal discharge operation.

SUMMARY OF THE INVENTION

In view of the above, it is an object of the present invention to provide a battery pack capable of performing its normal discharge operation even when an ambient temperature of a battery housed in the battery pack is detrimentally low, and thereby preventing the available period of time of an electronic device powered by the battery pack from decreasing due to such detrimentally low ambient temperature.

According to a first aspect of the present invention, there is provided a battery pack including:

the battery serving as a main power supply of an electronic device, the battery being provided with a positive plate and a negative plate;

a control circuit board electrically connected with both the positive plate and the negative plate of the battery;

a heating element for receiving therein the battery, the heating element being electrically connected with the control circuit board to heat and enable the battery to perform its normal discharge operation even when an ambient temperature of the battery is so low as to be out of a moderate temperature range compatible with its normal discharge operation; and whereby the battery prevents the available period of time of the electronic device from decreasing in use.

In the foregoing, a preferable mode is one that wherein includes:

a lower casing for receiving therein the battery, the heating element and the control circuit board in a condition in which the control circuit board is projected outward from the heating element so that the control circuit board is mounted on a board support base.

In addition to the above, a preferable mode is one that wherein further includes:

an upper casing for covering the battery, the heating element, the control circuit board and the lower casing.

Preferably, the control circuit board in the battery pack of the present invention comprises:

a temperature detecting element for detecting an ambient temperature of the battery to issue a detection signal to the control circuit board;

a switching element for turning ON and OFF the electric power supplied from said battery to said heating element; and a control circuit for controlling the electric current supplied from the battery to the switching element and to the heating element upon receipt of the detection signal issued from the temperature detecting element.

According to a second aspect of the present invention, there is provided a battery pack including:

a battery serving as a main power supply of an electric device, the battery being provided with a positive plate and a negative plate;

a control circuit board electrically connected with both the positive plate and the negative plate of the battery;

a heating element for receiving the battery therein, the heating element being electrically connected with the control circuit board through a pair of lead wires;

a lower casing for receiving therein the battery, the heating element and the control circuit board in a condition in which the control circuit board is projected outward from the heating element, so that the control circuit board is mounted on a board support base provided with a plurality of terminal output ports; and an upper casing for covering the battery, the heating element, the lead wires, the control circuit board and the lower casing; and whereby, even when an ambient temperature of the battery is so low as to be out of a moderate temperature range compatible with its normal discharge operation, said battery is capable of performing its normal discharge operation, and thereby preventing the available period of time of said electronic device powered by said battery from decreasing.

In the foregoing second aspect, a preferable mode is one wherein the control circuit board includes:

a temperature detecting element for detecting an ambient temperature of the battery to issue a detection signal to the control circuit board; and a switching element for turning ON and OFF the electric power supplied from the battery to the heating element; and a control circuit for controlling the electric current supplied from the battery to the switching element and to the heating element upon receipt of the detection signal issued from the temperature detecting element.

With the above configuration, the battery is capable of effectively heating the battery, and thereby increasing the temperature of the battery to keep it in a moderate temperature range compatible with its normal discharge operation, which makes it possible for the battery pack to supply a sufficient amount of electric power to the electronic device such as cellular phones or a like for an extended period of time.

BRIEF DESCRIPTION OF THE DRAWINGS

The above and other objects, advantages and features of the present invention will be more apparent from a following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
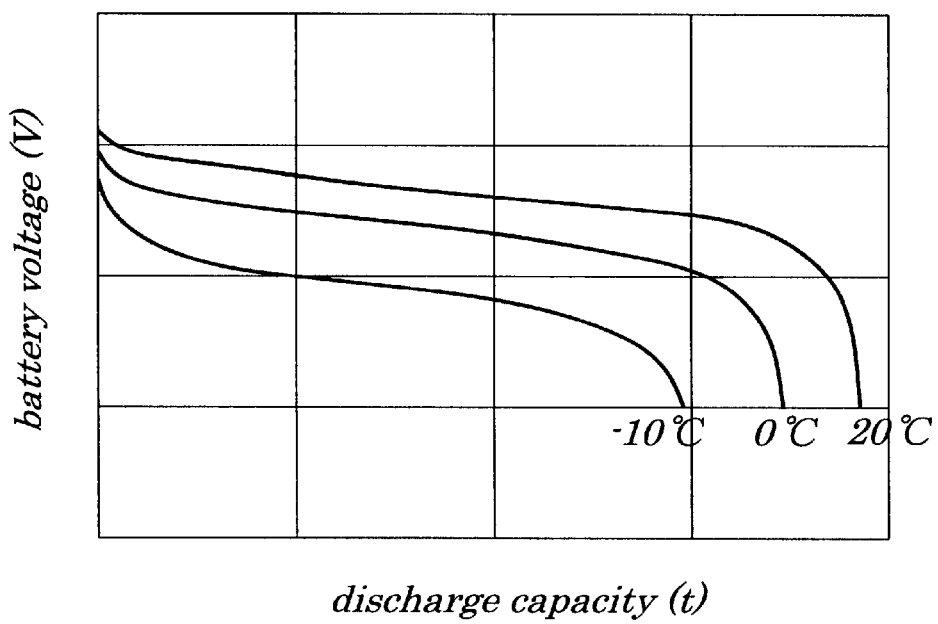
FIG. 1 is a graph of a conventional battery pack, illustrating its temperature characteristics, wherein: a horizontal axis represents a battery capacity in discharge cycle; a vertical axis represents a variation of battery voltage (volts); and, each of three curves denoting ambient temperatures "−10° C.", "0° C." and "20° C." shows the relationship between the battery capacity in discharge cycle and the variation of battery voltage (volts) at each of the ambient temperatures "−10° C.", "0° C." and "20° C."
Figure 2:
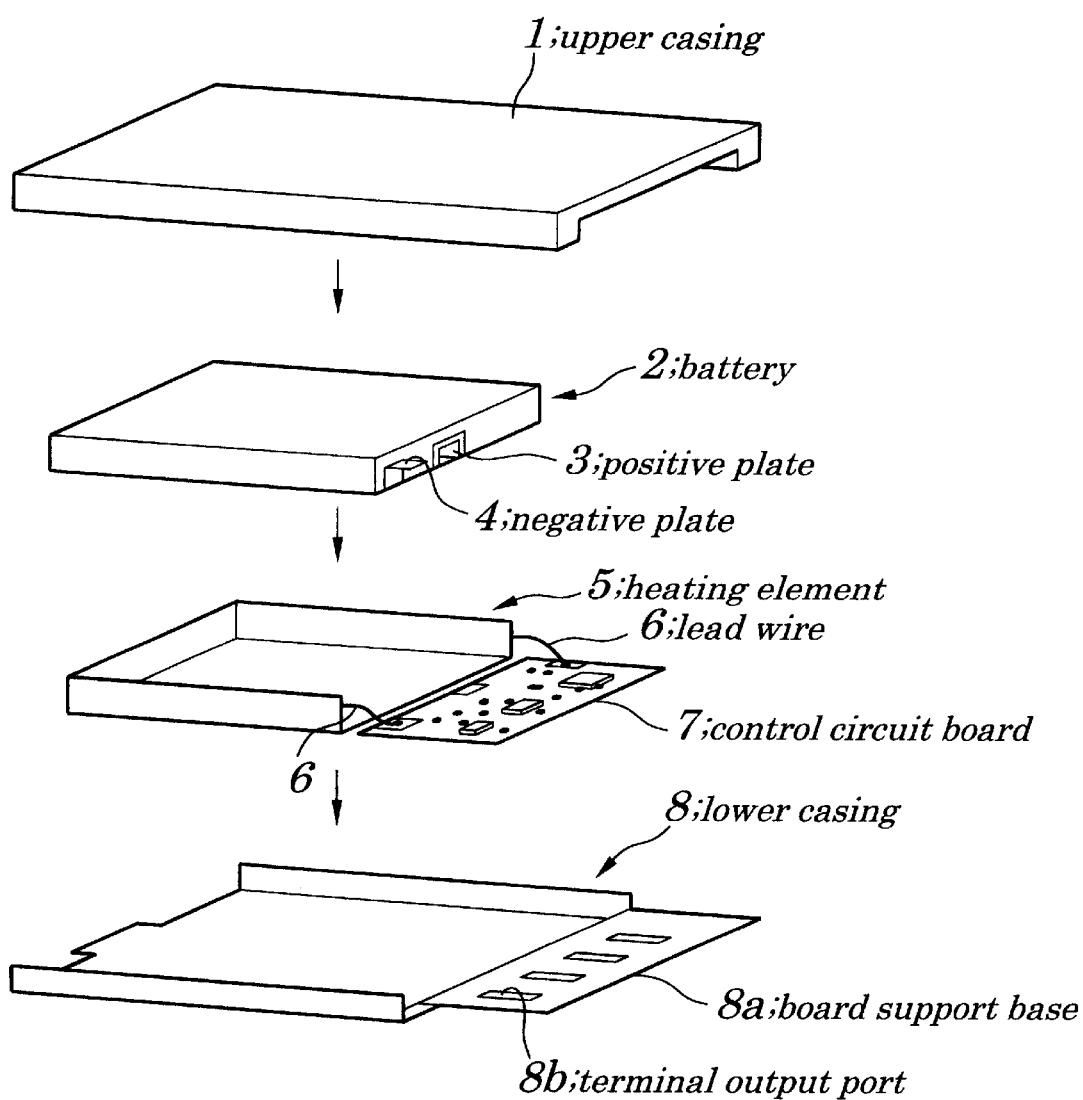
FIG. 2 is an exploded perspective view of a battery pack of the present invention, illustrating a schematic construction of the battery pack of the present invention.
Figure 3:
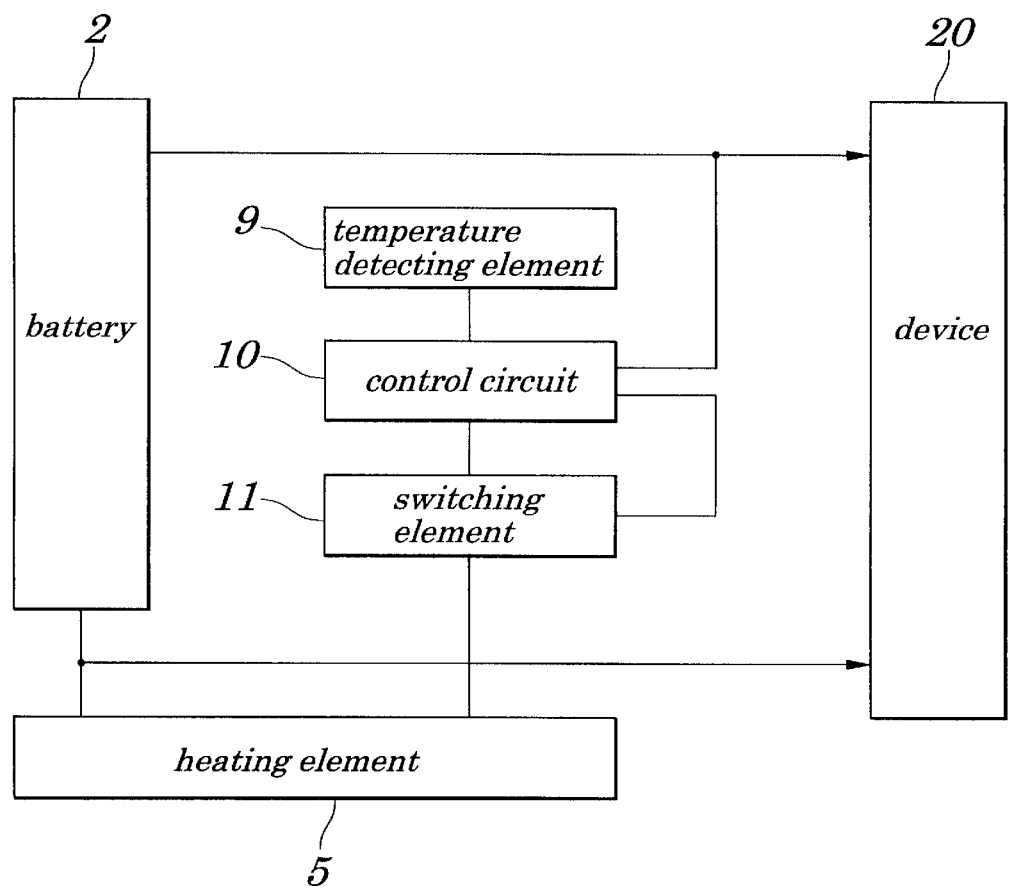
FIG. 3 is a block diagram of a control circuit board of a battery pack of the present invention.

FIG. 2 shows an exploded perspective view of an embodiment of a battery pack of the present invention, illustrating a schematic construction of the battery pack. Shown in FIG. 3 is a block diagram of the control circuit board of the battery pack of the present invention shown in FIG. 2.

As shown in FIG. 2, both a positive plate 3 and a negative plate 4 are mounted on one of side portions of a battery 2. On the other hand, a heating element 5 is formed into a predetermined shape which is capable of receiving the battery 2 therein. In assembly operations, the battery 2 is inserted into the heating element 5 from above as indicated by an intermediate one of the arrows shown in FIG. 2, and has both its positive plate 3 and its negative plate 4 electrically connected with a control circuit board 7.

This control circuit board 7 is electrically connected with the heating element 5 through a pair of lead wires 6. In other words, the battery 2, heating element 5 and the control circuit board 7 including the lead wires 6 are assembled into an assembly (2, 5, 6 and 7) in a manner described above. This assembly (2, 5, 6 and 7) is then inserted into a lower casing 8 from above as indicated by a lowest one of the arrows shown in FIG. 2, in a condition in which the control circuit board 7 is projected outward from the heating element 5.

As a result, after completion of insertion of the above assembly (2, 5, 6 and 7) into the lower casing 8, the control circuit 45 board 7 is mounted on a board support base 8a.

Incidentally, as is clear from FIG. 2, the board support base 8a is provided with a plurality of terminal output ports 8b. After that, an upper casing 1 is then mounted on both the assembly (2, 5, 6 and 7) and the lower casing 8 to cover them, so that the battery pack of the embodiment of the present invention is completed.

As shown in FIG. 3, the control circuit board 7 of the battery pack of the present invention is provided with: a temperature detecting element 9 for detecting an ambient temperature of the battery 2 to issue a detection signal; a switching element 11 for turning ON and OFF the electric power supplied from the battery 2 to the heating element 5; and, a control circuit 10 for controlling the electric current supplied from the battery 2 to the switching element 11 and to the heating element 5 upon receipt of the detection signal issued from the temperature detecting element 9.

The battery pack of the embodiment of the present invention having the above construction operates as follows:

In use, the battery pack of the present invention is mounted in an electric device 20, for example such as cellular phones or a like. In operation, when an ambient temperature of the battery 2 housed in the battery pack of the present invention decreases to reach a detrimental low temperature, the temperature detecting element 9 of the battery pack detects such a detrimental low temperature to issue the detection signal to the control circuit 10. Upon receipt of such detection signal, the control circuit 10 turns ON the switching element 11 to permit the battery 2 to supply its electric power to the heating element 5, so that the heating element 5 produces heat to increase the temperature of the battery 2. At this time, the control circuit 10 controls the electric current supplied from the battery 2 to the heating element 5 in a manner such that the battery 2 is heated and has its temperature remains in the moderate temperature range compatible with its normal discharge operation. The temperature detecting element 9 may be constructed of a thermistor, a suitable temperature sensor and the like. On the other hand, the switching element 11 may be constructed of a suitable ON/OFF unit, for example, such as FET switches and the like controlled by an electric signal issued from the control circuit 10.

In the above embodiment of the battery pack of the present invention, though the temperature detecting element 9 is formed on the control circuit board 7 to detect the ambient temperature of the battery 2, it is also possible to form this temperature detecting element 9 on the battery 2 itself, which makes it possible to monitor and control the battery 2 in temperature.

As described above, in the battery pack according to the present invention, the battery 2 is surrounded by the heating element 5. Consequently, even when the ambient temperature of the battery 2 decreases to reach a detrimental low temperature preventing the battery 2 from performing its normal discharge operation, it is possible to effectively heat the battery 2, and thereby increasing the temperature of the battery 2 to keep it in a moderate temperature range compatible with the normal discharge operation of the battery 2, which makes it possible for the battery 2 to supply a sufficient amount of electric power to the electronic device such as cellular phones of a like for an extended period of time. The above is a remarkable effect of the present invention.

Since many changes and modification's can be made to the above embodiment of the present invention in construction without departing from the spirit of the present invention, it is intended that all matters given in the above description and illustrated in the accompanying drawings shall be interpreted to be illustrative only and not as a limitation to the subject of the present invention.

It is thus apparent that the present invention is not limited to the above embodiments but may be changed and modified without departing from the scope and spirit of the invention.

Finally, the present application claims the Convention Priority based on Japanese Patent Application No. Hei11-029941 filed on Feb. 8, 1999, which is herein incorporated by reference.

What is claimed is:

1. A battery pack comprising:

a battery provided with a positive plate and a negative plate and serving as a power supply of an electronic device, said battery providing an available period of time to use the electronic device, a control circuit board electrically connected with both said positive plate and said negative plate of said battery;

a case shaped of heating element electrically connected with said control circuit board said case shaped heating element comprising a bottom plate portion and at least three side wall portions to receive said battery therein;

a lower casing for receiving therein said battery within said case shaped heating element;

a board support base provided with a plurality of terminal output ports and projected outward from a side portion of said lower casing, such that said board support base mounts thereon said control circuit board which is projected outward from said case shaped heating element;

an upper casing for covering said battery, said case shaped heating element, said control circuit board, and said lower casing; and whereby, even when an ambient temperature of said battery decreases to a level reducing the available period of time to use the electronic device, said battery prevents the available period of time to use the electronic device from decreasing by activating said case shaped heating element.

2. The battery pack according to claim 1, wherein said control circuit board comprises:

a temperature detecting element for issuing a detection signal to said control circuit board when the ambient temperature of said battery decreases to a level reducing the available period of time to use the electronic device;

a switching element for turning ON and OFF the electric power supplied from said battery to said heating element; and a control circuit for controlling the electric current from said battery to said switching element and to said heating element upon receipt of said detection signal issued from said temperature detecting element.

* * * * *